(12) United States Patent
Peng et al.

(10) Patent No.: US 11,431,524 B2
(45) Date of Patent: Aug. 30, 2022

(54) INTERNET OF THINGS NETWORK SYSTEM AND NETWORKING METHOD THEREOF

(71) Applicant: REALTEK SEMICONDUCTOR CORP., Hsinchu (TW)

(72) Inventors: Zuo-Hui Peng, Hsinchu (TW); Zhao-Ming Li, Hsinchu (TW); Guo-Feng Zhang, Hsinchu (TW); Cui Ding, Hsinchu (TW); Jing-Jun Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 168 days.

(21) Appl. No.: 16/922,646

(22) Filed: Jul. 7, 2020

(65) Prior Publication Data
US 2021/0288837 A1 Sep. 16, 2021

(30) Foreign Application Priority Data
Mar. 16, 2020 (CN) .......................... 202010181344.2

(51) Int. Cl.
*H04L 12/44* (2006.01)
*H04L 67/12* (2022.01)
*G16Y 30/00* (2020.01)

(52) U.S. Cl.
CPC .............. *H04L 12/44* (2013.01); *H04L 67/12* (2013.01); *G16Y 30/00* (2020.01)

(58) Field of Classification Search
CPC .................. E05F 15/632; E05F 15/643; E05Y 2900/132; G16Y 30/00; H04L 12/44; H04L 67/12; H04W 48/20; H04W 84/12
See application file for complete search history.

(56) References Cited

U.S. PATENT DOCUMENTS

| 11,089,529 | B1* | 8/2021 | Lekutai ................. H04W 36/30 |
| 2004/0090943 | A1 | 5/2004 | Da Costa et al. |
| 2004/0103282 | A1 | 5/2004 | Meier et al. |
| 2011/0264915 | A1 | 10/2011 | Cam-Winget et al. |

(Continued)

FOREIGN PATENT DOCUMENTS

| CN | 107231627 A | 10/2017 |
| CN | 107889119 A | 4/2018 |

(Continued)

*Primary Examiner* — Zhensheng Zhang
(74) *Attorney, Agent, or Firm* — Birch, Stewart, Kolasch & Birch, LLP (57) ABSTRACT

An Internet of Things (IoT) network system and a networking method thereof are provided. The IoT network system is connected to a wireless access point and includes a plurality of network nodes and an idle node. The plurality of network nodes are communicatively connected to the wireless access point through a tree topology to form a first tree structure. In order to join the IoT network, when communication signal quality of the idle node with respect to the wireless access point is greater than a preset value, the idle node is communicatively connected to the wireless access point to form a root node of a second tree structure. When the communication signal quality of the idle node with respect to the wireless access point is not greater than the preset value, the idle node joins the IoT network by using one of network nodes in the first tree structure as a parent node.

20 Claims, 4 Drawing Sheets

(56) References Cited

U.S. PATENT DOCUMENTS

| | | | |
|---|---|---|---|
| 2015/0049644 A1 | 2/2015 | Lee | |
| 2015/0341939 A1* | 11/2015 | Sharma | H04W 52/44 370/329 |
| 2015/0349874 A1* | 12/2015 | Bhargava | H04L 5/0057 370/315 |
| 2016/0302233 A1* | 10/2016 | Gopala Krishnan | H04W 74/0833 |
| 2017/0054644 A1 | 2/2017 | Dasgupta et al. | |
| 2017/0272317 A1* | 9/2017 | Singla | H04L 67/02 |

FOREIGN PATENT DOCUMENTS

| | | |
|---|---|---|
| CN | 108156644 A | 6/2018 |
| CN | 108199905 A | 6/2018 |
| CN | 108366019 A | 8/2018 |
| CN | 108366362 A | 8/2018 |
| CN | 108391238 A | 8/2018 |
| CN | 109743388 A | 5/2019 |

* cited by examiner

INTERNET OF THINGS NETWORK SYSTEM AND NETWORKING METHOD THEREOF

CROSS-REFERENCE TO RELATED APPLICATION

This non-provisional application claims priority under 35 U.S.C. § 119(a) to Patent Application No. 202010181344.2 filed in China, P.R.C. on Mar. 16, 2020, the entire contents of which are hereby incorporated by reference.

BACKGROUND

Technical Field

The present invention relates to an IoT network, and in particular, to an IoT network system and a networking method thereof.

RELATED ART

A traditional wireless network mainly adopts a point-to-point or point-to-multipoint topology. The topology generally has a central node, for example, a wireless access point (AP) in the general standard (IEEE 802.11) of wireless local area networks. All wireless terminal apparatuses, such as IoT devices, needs to access a network through a wireless link connected to the wireless access point. If a user needs to perform a communication, the user needs to access a fixed wireless access point first. This type of network is referred to as a single-hop network.

Due to changes in user requirements, the wireless terminal apparatuses are increasing. Therefore, a family usually needs to establish a connection to and use a plurality of wireless terminal apparatuses. However, a number of connections to the wireless access points is usually limited. Therefore, a plurality of wireless terminal apparatuses cannot be connected to the wireless access point simultaneously. In addition, the wireless access point does not have enough signal coverage.

In addition, since specified wireless mesh network nodes related to a mesh network in the general standard (IEEE 802.11S) are not proposed for IoT devices, excessive attention is paid on mobility of node devices and stability of a network, increasing resource consumption. Moreover, a node in the wireless mesh network to be connected to an external network mentioned in the general standard for wireless area networks is usually connected to the Ethernet, failing to meet the requirements of IoT devices. A protocol of the wireless mesh network is also complex and difficult to achieve.

SUMMARY

In view of the above, the present invention provides an IoT network system and a networking method thereof to meet network connecting needs of a large number of IoT apparatuses, improve network connecting stability and a transmission rate of the IoT apparatus, and expand coverage of a wireless network.

According to some embodiments, the IoT network system is connected to a wireless access point. The IoT network system includes a plurality of network nodes and an idle node. The plurality of network nodes are communicatively connected to the wireless access point through a tree topology to form a first tree structure. If a node type of the idle node is not defined, when communication signal quality of the wireless access point is greater than a preset value, the idle node is communicatively connected to the wireless access point to form a root node in a second tree structure to join the IoT network. When the communication signal quality of the wireless access point is not greater than the preset value, the idle node joins the IoT network by using one of the network nodes in the first tree structure as a parent network.

According to some embodiments, the idle node obtains at least one adjacent candidate node through scanning from the network nodes, and selects a candidate node with fewest hops as the parent node according to a number of hops between each of the at least one candidate node and the wireless access point.

According to some embodiments, if there are a plurality of candidate nodes with the fewest hops, the idle node further selects, as the parent node, a candidate node with fewest child nodes from the candidate nodes with the fewest hops.

According to some embodiments, the idle node obtains at least one adjacent candidate node through scanning from the network nodes, and selects, as the parent node, a candidate node with fewest child nodes from the at least one candidate node.

According to some embodiments, the parent node meets a networking condition, the networking condition including the following: the parent node has a data transfer capability, a number of child nodes of the parent node does not reach a child node number upper limit, and a number of hops between the parent node and the wireless access point does not reach a tier upper limit.

According to some embodiments, if the idle node is defined as a root node type, the idle node is communicatively connected to the wireless access point to form the root node of the second tree structure to join the IoT network.

According to some embodiments, if the idle node is defined as a leaf node type, the idle node joins the IoT network by using one of the network nodes in the first tree structure or the second tree structure as the parent node.

According to some embodiments, the idle node sends a connection request to one of the network nodes in the first tree structure, a connection response is returned after the network node performs authentication according to the connection request, and the idle node joins the IoT network by using the network node as the parent node according to the connection response.

According to some embodiments, when the communication signal quality of the wireless access point is not greater than the preset value, and no network node meeting a networking condition is found through searching as the parent node, the idle node reduces the preset value to a weak preset value. When the communication signal quality of the wireless access point is greater than the weak preset value, the idle node is communicatively connected to the wireless access point to form the root node of the second tree structure to join the IoT network.

According to some embodiments, a networking method of an IoT network includes: If a node type of the idle node is not defined, detecting communication signal quality of the wireless access point through the idle node; when the communication signal quality of the wireless access point is greater than a preset value, communicatively connecting the idle node to the wireless access point to form a node in a second tree structure; and when the communication signal quality of the wireless access point is not greater than the preset value, joining, by the idle node, the IoT network by using one of the network nodes in the first tree structure as a parent network.

According to some embodiments, the networking method of an IoT network further includes: when the communication signal quality of the wireless access point is not greater than the weak preset value, suspending, by the idle node, networking; and when networking suspension duration reaches a timeout threshold, re-detecting the communication signal quality of the wireless access point through the idle node.

In summary, according to some embodiments, a communicative connection is established to the wireless access point through the plurality of root nodes in the IoT network to overcome connection limitation of the wireless access point, and a negotiation time between root nodes is reduced through a simplified networking process. In the IoT network structure with a plurality of root nodes, a data transfer load of a single root node is reduced, and when a single root node fails, other root nodes may be switched to. Then, the IoT network can continue operation through other root nodes, thereby greatly improving stability of the IoT network. During uplink transmission performed by an apparatus in the IoT network using the tree topology, route selection is not required. During downlink transmission, the apparatus in the IoT network only needs a routing table so that the apparatus in the IoT network can forward data layer by layer to child nodes according to the routing table to improve a data transmission speed. Through the IoT network, apparatuses are communicatively connected to each other to expand the coverage of the IoT network, meet requirements of a large number of IoT apparatuses to be connected to the network simultaneously, and reduce circuit layouts and damage to the fixed facilities.

DETAILED DESCRIPTION

Figure 1:
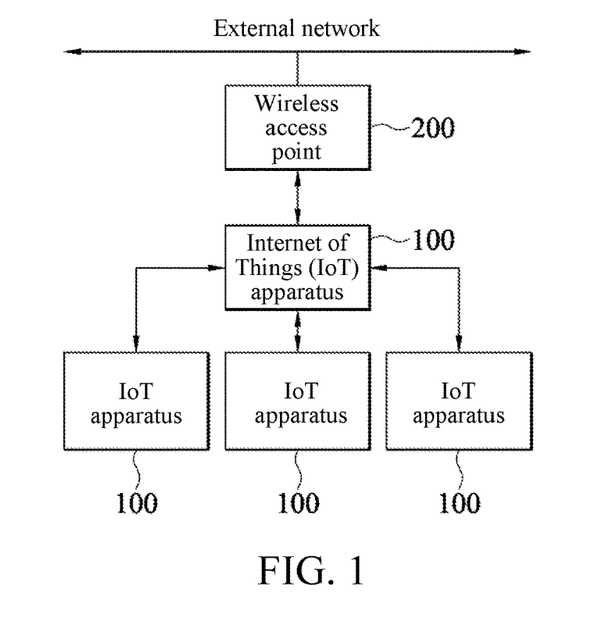
FIG. 1 is a schematic diagram of an architecture of an IoT network according to an embodiment of the present invention.

FIG. 1 is a schematic diagram of an architecture of an IoT network according to an embodiment of the present invention. The IoT network consists of a plurality of IoT apparatuses 100, and is connected to a wireless access point 200 through a tree network topology. Each IoT apparatus 100 serves as a node in the IoT network. A term "networking" is to be described herein, which refers to a process in which the IoT apparatuses 100 form an IoT network.

A term "network configuration" is to be described herein, which means to perform authentication on the IoT apparatuses 100 that are to form an IoT network and perform network configuration on authenticated IoT apparatuses 100 so that the apparatuses can obtain information required for subsequent networking (which is referred to as "network configuration data" below).

Figure 2:
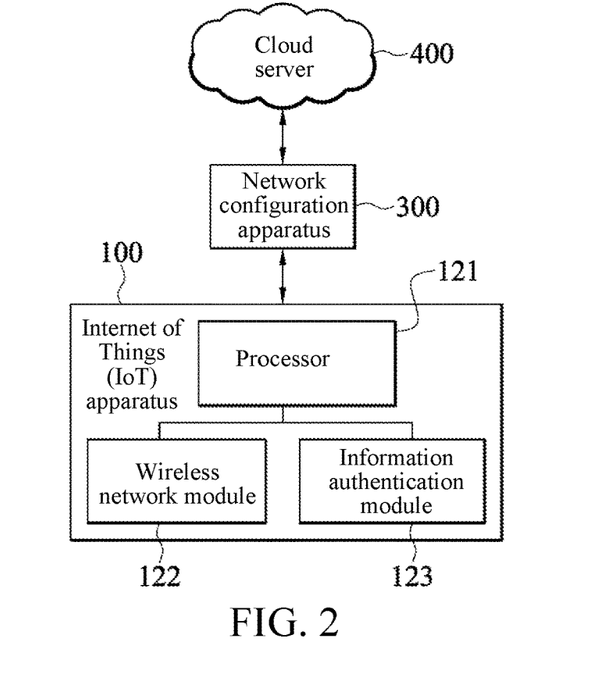
FIG. 2 is a schematic diagram of performing network configuration on an IoT apparatus according to an embodiment of the present invention.

FIG. 2 is a schematic diagram of performing network configuration on an IoT apparatus 100 according to an embodiment of the present invention. A network configuration apparatus 300 is configured to perform authentication and network configuration on the IoT apparatus 100. The IoT apparatus 100 includes a processor 121, a wireless network module 122, and an information authentication module 123. The processor 121 is connected to and controls the wireless network module 122 and the information authentication module 123. The wireless network module 122 may provide a wireless network communication function to wirelessly communicate with other apparatuses and establish a node link. The information authentication module 123 may perform authentication on the network configuration apparatus 300, so that after determining that the IoT apparatus 100 may server as a node in the IoT network, the network configuration apparatus 300 may send network configuration data to the IoT apparatus 100. The IoT apparatus 100 may be, for example, household appliances (such as a refrigerator or a TV, etc.), but the present invention is not limited thereto. It may be understood that the IoT apparatus 100 may further include other software or hardware components to achieve a specific purpose. For example, a lighting apparatus may further include a light bulb or a lamp tube, or may have a button or a knob that can be used to control brightness. There are numerous types of IoT apparatuses 100. Examples are not enumerated herein. The network configuration apparatus 300 may be mobile apparatuses such as a smart phone, a personal digital assistant (PDA), a tablet computer, and a notebook computer, etc.

In some embodiments, the network configuration apparatus 300 obtains first authentication information of the IoT apparatus 100 from the IoT apparatus 100 in a first information obtaining manner, and obtains second authentication information of the IoT apparatus 100 in a manner different from the first information obtaining manner. When it is recognized that the two pieces of authentication information are the same or are corresponding to each other, it is determined that the authentication succeeds. The first information obtaining manner may be, for example, scanning and decoding a QR code formed by encoding the first authentication information to obtain the first authentication information. The QR code may be provided on a housing of the IoT apparatus 100. Alternatively, the first authentication information is sent to the network configuration apparatus 300 through a short-range wireless communication protocol supported by the information authentication module 123, such as Bluetooth, near field communication (NFC), a wireless hotspot (Wi-Fi), etc.

In some embodiments, the network configuration architecture may further include a cloud server 400 (shown in FIG. 2). The foregoing second information obtaining manner may be, for example, providing the second authentication information to the network configuration apparatus 300 through the cloud server 400.

In some embodiments, the foregoing second information obtaining manner may also be providing the second authentication information to the network configuration apparatus 300 in other manners. For example, a user inputs the second authentication information through an operation interface of the network configuration apparatus 300.

In some embodiments, the first authentication information and the second authentication information are associated with the IoT apparatus 100. For example, both adopt parameters such as a factory serial number, a model number, and a media access control (MAC) address of the IoT apparatus 100, or a variety of parameters may be arranged in a specific way, or further converted according to a specific algorithm, such as an encryption algorithm, a hash algorithm, etc. In some embodiments, one of the first authentication information and the second authentication information adopts an original parameter or combination, and the other adopts a parameter obtained by converting the original parameter or combination according to a specific algorithm.

A term "parent node" is to be described herein, which refers to a node for next transmission of a sending node during uplink transmission of the sending node.

A term "child node" is to be described herein, which refers to a node for next transmission of a sending node during downlink transmission of the sending node.

A term "hop number" is to be described herein, which refers to required times of data delivery between two nodes.

A term "root node" is to be described herein, which refers to a node connected to the wireless access point 200, that is, a first node through which the wireless access point 200 passes to transmit data to the IoT network.

A term "relay node" is to be described herein, which refers to a node with receiving, sending, and forwarding functions, and is connected to a node in an uplink direction of the relay node, and may be connected to other nodes in a downlink direction of the relay node to forward data sent from a parent node and a child node of the relay node.

A term "leaf node" is to be described herein, which refers to a node connected to a node (that is, a parent node) only in an uplink direction. An IoT apparatus 100 without a data transfer capability usually serves as the leaf node, but the present invention is not limited thereto. If necessary, an IoT apparatus 100 capable of serving as a root node or a relay node may also be set as the leaf node.

In some embodiments, the network configuration data includes a service set identifier (SSID) and a password of the wireless access point 200. In some embodiments, the network configuration data includes a node type corresponding to the IoT apparatus 100 (that is, specified as a root node or a leaf node), etc.

For ease of describing forming of an IoT network by the IoT apparatuses 100 herein, an IoT apparatus 100 that already serves as a node in the IoT network is referred to as a "network node". An IoT apparatus 100 that does not serve as a node in the IoT network is referred to as an "idle node".

Figure 3:
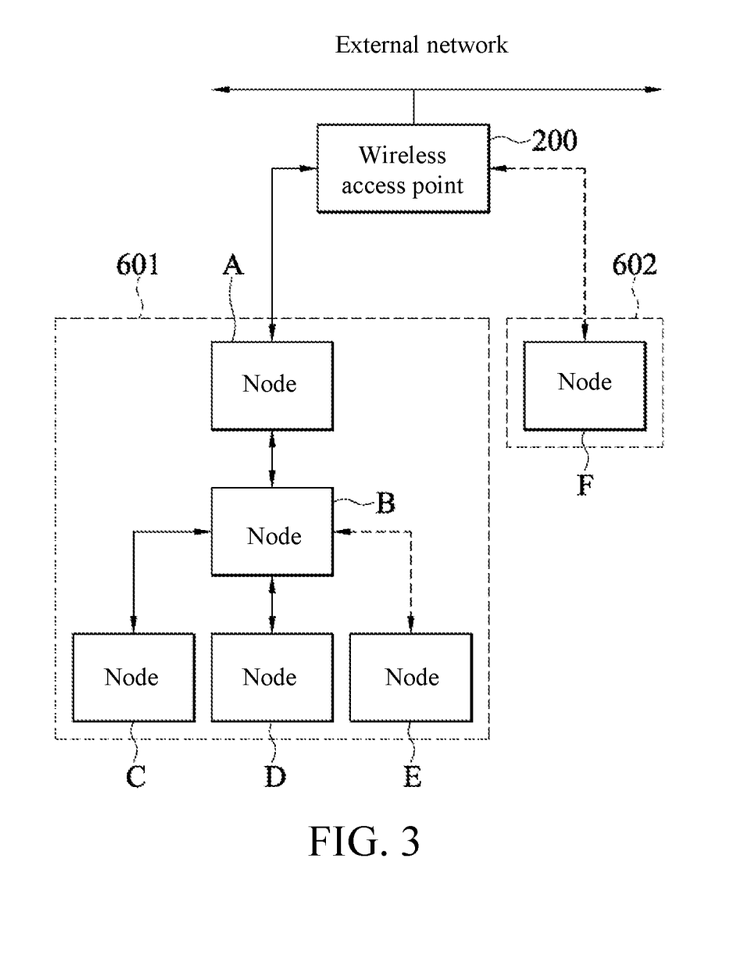
FIG. 3 is a schematic diagram of an architecture of an IoT network according to another embodiment of the present invention.

FIG. 3 is a schematic diagram of an architecture of an IoT network according to another embodiment of the present invention. Compared to FIG. 1, in addition to a tree structure (which is referred to as a "first tree structure 601" below), the IoT network in this embodiment may further include another or more tree structures. For example, the IoT network includes another tree structure (which is referred to as a "second tree structure 602") herein. In other words, the IoT network may include a plurality of tree structures connected to the wireless access point 200, thereby expanding the network coverage. In addition, since the wireless access point 200 is connected to a plurality of root nodes belonging to different tree structures, network stability can be enhanced. In addition, in this network topology, route selection is not required during uplink transmission, and it only needs to forward data to the lower layer nodes according to a routing table during downlink transmission. Thus, a resource burden of each node can be reduced and a data transmission time can be shortened. The first tree structure 601 herein includes a plurality of nodes A to D and a node E to serve as a child node of the node B. The second tree structure 602 includes a node F to serve as a root node of the second tree structure 602.

Figure 4:
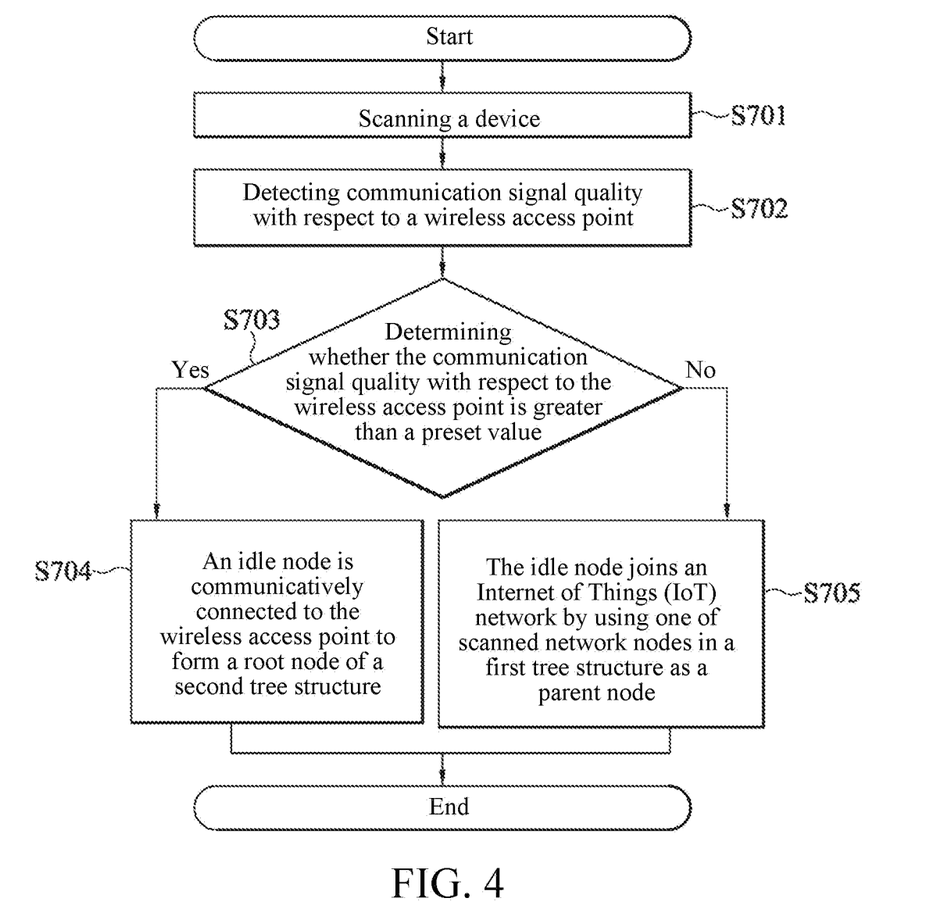
FIG. 4 is a flowchart of determining a networking mode of an IoT apparatus according to an embodiment of the present invention.

FIG. 4 is a flowchart of determining a networking mode of an IoT apparatus 100 according to an embodiment of the present invention. When an IoT apparatus 100 (an idle node) wants to join the IoT network, in a networking manner, the apparatus joins an existing tree structure. For example, the apparatus serves as a child node (for example, the node E) of one (for example, the node B) of network nodes in the first tree structure 601. In another networking manner, a new tree structure is established. For example, the apparatus serves as the root node (for example, the node F) of the second tree structure 602 to be connected to the wireless access point 200. For determining of networking in one of the two ways, refer to a process in FIG. 4.

Step S701: Scanning a device. An idle node scans an adjacent device. The device refers to the wireless access point 200 and the IoT apparatus 100 that can form the same IoT network after the foregoing network configuration. The scanned IoT apparatus 100 may be a candidate node of the parent node.

Step S702: Detecting communication signal quality with respect to the wireless access point 200. If a node type of the idle node is not defined, the communication signal quality of the idle node with respect to the wireless access point 200 is detected (if the wireless access point 200 is obtained through scanning). If the node type is defined, additional description is given below. The case in which the node type is not defined is described first. The communication signal quality may be wireless signal strength. For example, the communication signal quality may be determined based on a received signal strength indication (RSSI) of the wireless access point 200 obtained through the wireless network module 122. In some embodiments, the node type may be defined during a network configuration stage, and the idle node learns, through network configuration data, a node type as which the idle node is defined. In some embodiments, the node type may be defined at other stages, for example, the node type is preset at the factory, or set by a user through input at any time.

Step S703: Determining whether the communication signal quality with respect to the wireless access point 200 is greater than a preset value. If yes, that is, when the communication signal quality of the idle node with respect to the wireless access point 200 is greater than the preset value, the idle node is communicatively connected to the wireless access point 200 to form the root node (for example, the node F) of the second tree structure 602, that is, step S704 is performed. If not, that is, when the communication signal quality of the idle node with respect to the wireless access point 200 is not greater than the preset value, the idle node joins the IoT network by using one (for example, the node B) of scanned network nodes in the first tree structure 601 as the parent node, that is, step S705 is performed.

Figure 5:
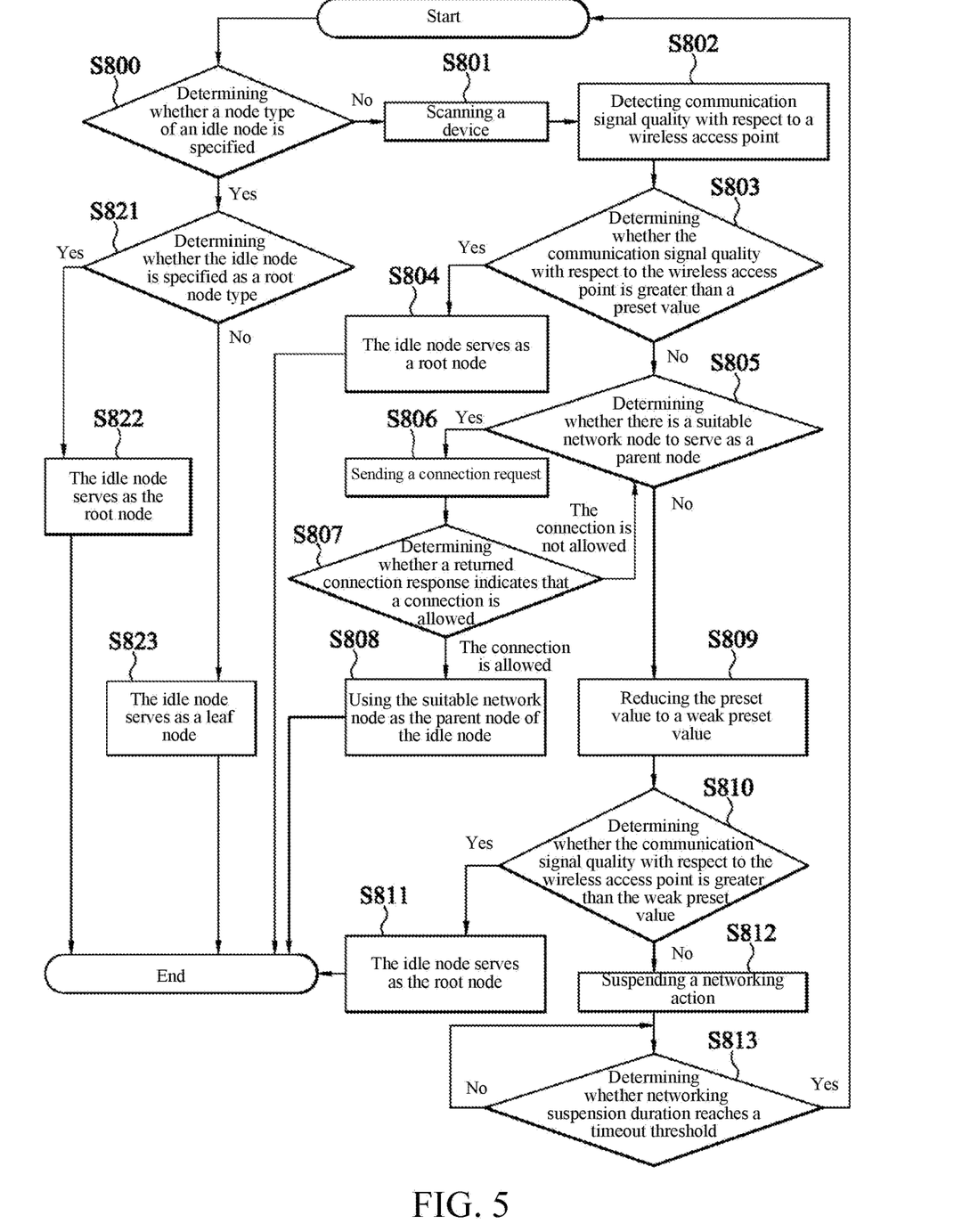
FIG. 5 is a networking flowchart of an IoT network according to an embodiment of the present invention.

FIG. 5 is a networking flowchart of an IoT network according to an embodiment of the present invention. In step S800, the idle node first determines whether the node type of the idle node is specified. If the node type of the idle node is not specified, step S801 is performed. As described above, performing of networking is further determined. Steps S801 to S804 are the same as steps S701 to S704, and the descriptions are not be repeated. If the node type of the idle node is specified, step S821 of determining whether the idle node is specified as a root node type is performed. If the idle node is specified as the root node type, step S822 is performed. The idle node serves as the root node of the second tree structure, that is, the idle node is communicatively connected to the wireless access point 200. If the idle node is not specified as the root node type, step S823 is entered. The idle node serves as a leaf node of a tree structure (for example, the first tree structure 601 or the second tree structure 602), that is, the idle node uses a network node in a tree structure as a parent node of the idle node.

Determining of a network node as the parent node by the idle node to join the IoT network is further described herein. As shown in FIG. 5, different from step S705 shown in FIG. 4, in step S805, it is determined whether there is a suitable network node that can serve as the parent node of the idle node. The suitable network node refers to a network node that meets a networking condition. The networking condition is described later. If there is no suitable network node, step S809 is performed. If there is a suitable network node, the idle node sends a connection request to the suitable network node (step S806). The network node performs authentication on the idle node according to the connection request to return a connection response. Next, in step S807, the idle node determines whether the connection response returned by the network node indicates that a connection is allowed. If the connection is allowed, the suitable network node is used as the parent node of the idle node (step S808). If the connection is not allowed, the idle node will go back to perform step S805 to check whether still have other suitable network node to serve as parent node. If there is no other suitable network node as parent node, the idle node will reduce the foregoing preset value to a weak preset value (step S809).

Step S810: Determining whether the communication signal quality with respect to the wireless access point 200 is greater than the weak preset value. Since a connection threshold is reduced from the preset value to the weak preset value, under the same environment, although the communication signal quality is lower than the preset value, the communication signal quality may be higher than the weak preset value, and the idle node may be communicatively connected to the wireless access point 200 to serve as the root node of the second tree structure 602 (step S811). If the communication signal quality is still lower than the weak preset value, the idle node first suspends a networking action (step S812). Next, in step S813, it is determined whether networking suspension duration reaches a timeout threshold. If not, that is, the networking suspension duration doesn't reach the timeout threshold, step S813 continues. If yes, that is, the networking suspension duration reaches the timeout threshold, returning to the beginning of the steps (or step S801, or step S802, not shown), and the foregoing process is performed to re-detect the communication signal quality with respect to the wireless access point 200 and determine whether the idle node can be communicatively connected to the wireless access point 200 as a root node. Therefore, idle nodes may continuously attempt to join the IoT network to ensure reliability of the IoT network.

In some embodiments, before step S822, steps S801 to S803 (not shown) are further performed. In other words, the wireless access point 200 is first scanned to determine whether the idle node is within communication range of the wireless access point 200, and the communication signal quality with respect to the wireless access point 200 is detected to determine whether communication signal quality is greater than a preset value. If the communication signal quality is greater than the preset value, step S804 is performed to serve as a root node of a new tree structure (for example, the second tree structure 602). If no wireless access point 200 is scanned, or the communication signal quality is not greater than the preset value, the preset value is reduced (as in step S809), and a process following step S809 continues. The details are not repeated herein.

In some embodiments, before step S823, it is determined whether there is a suitable network node as described in step S805. Adjacent candidate nodes may also be found through a scanning device to select a node meeting a networking condition from the candidate nodes.

The networking condition includes the following: the network node has a data transfer capability, a number of child nodes of the network node does not reach a child node number upper limit, and a number of hops between the network node and the wireless access point 200 does not reach a tier upper limit. A node with the data transfer capability refers to a relay node type or a root node type. A node (that is, a leaf node type) without the data transfer capability cannot serve as the parent node of the idle node. In order to prevent a node from burdening an excessive amount of forwarded data, each parent node has an upper limit on a number of child nodes that are allowed to be connected to the parent node. If a number of connected child nodes reaches the upper limit, no more new idle node is allowed to be connected to the parent node as a child node of the parent node. In addition, each tree structure has a tier upper limit to avoid an excessively long data transfer time as a result of excessive hierarchies of the tree structure. If a number of hops between a network node to which a connection is to be established and the wireless access point 200 reaches the tier upper limit, no more new idle node is allowed to be connected to the network node as a child node of the network node.

In some embodiments, if a plurality of candidate nodes meet the networking condition, the idle node selects, as the parent node of the idle node, a candidate node with fewest hops according to a number of hops between each candidate node and the wireless access point 200. If there are a plurality of candidate nodes with the fewest hops, the idle node further selects, as the parent node of the idle node, a candidate node with fewest child nodes. In this way, the most suitable network node can be found as the parent node of the idle node.

In some embodiments, if a plurality of candidate nodes meet the networking condition, the idle node may first select some candidate nodes with better communication signal quality as candidates based on communication signal quality of the candidate nodes, and further select, as the parent node of the idle node, a candidate node with fewest hops from the candidates according to the number of hops between each candidate node and the wireless access point 200. If there are a plurality of candidate nodes with the fewest hops, a candidate node with fewest child nodes is further selected as the parent node of the idle node.

In some embodiments, a node with fewest child nodes may be preferentially selected as the parent node of the idle node.

After the networking is completed through the foregoing networking process, a routing table stored by each node between a newly added node and the wireless access point 200 is updated. In this way, when data is to be transferred to the newly added node, the nodes may forward the data according to the updated routing tables, so that the newly added node can obtain the data.

In summary, according to some embodiments, a communicative connection is established to the wireless access point through the plurality of root nodes in the IoT network to overcome connection limitation of the wireless access point, and a negotiation time between root nodes is reduced through a simplified networking process. In the IoT network structure with a plurality of root nodes, a data transfer load of a single root node is reduced, and when a single root node fails, other root nodes may be switched to. Then, the IoT network can continue operation through other root nodes, thereby greatly improving stability of the IoT network. During uplink transmission performed by an apparatus in the IoT network using the tree topology, route selection is not required. During downlink transmission, the apparatus in the IoT network only needs a routing table so that the apparatus in the IoT network can forward data layer by layer to child nodes according to the routing table to improve a data transmission speed. Through the IoT network, apparatuses are communicatively connected to each other to expand the coverage of the IoT network, meet requirements of a large number of IoT apparatuses to be connected to the network simultaneously, and reduce circuit layouts and damage to the fixed facilities.

What is claimed is:

1. An Internet of Things (IoT) network system connected to a wireless access point, comprising:
   a plurality of network nodes communicatively connected to the wireless access point through a tree topology to form a first tree structure; and
   an idle node, configured to obtain network configuration data and enters a networking stage after passing an authentication in a network configuration stage, and the idle node determines whether it has been defined with a node type according to the network configuration data in the networking stage, wherein if the node type of the idle node is not defined, when communication signal quality of the wireless access point is greater than a preset value, the idle node is communicatively connected to the wireless access point to form a root node in a second tree structure to join the IoT network, and when the communication signal quality of the wireless access point is not greater than the preset value, the idle node joins the IoT network by using one of the network nodes in the first tree structure as a parent network.

2. The IoT network system according to claim 1, wherein the idle node obtains at least one adjacent candidate node through scanning from the network nodes, and selects, as the parent node of the idle node, a candidate node with fewest hops according to a number of hops between each of the at least one candidate node and the wireless access point.

3. The IoT network system according to claim 2, wherein if there are a plurality of candidate nodes with the fewest hops, the idle node further selects, as the parent node of the idle node, a candidate node with fewest child nodes from the candidate nodes with the fewest hops.

4. The IoT network system according to claim 1, wherein the idle node obtains at least one adjacent candidate node through scanning from the network nodes, and selects, as the parent node of the idle node, a candidate node with fewest child nodes from the at least one candidate node.

5. The IoT network system according to claim 1, wherein the parent node meets a networking condition, the networking condition comprising the following: the parent node has a data transfer capability, a number of child nodes of the parent node does not reach a child node number upper limit, and a number of hops between the parent node and the wireless access point does not reach a tier upper limit.

6. The IoT network system according to claim 1, wherein if the node type of the idle node is defined as a root node type, the idle node is communicatively connected to the wireless access point to form the root node of the second tree structure to join the IoT network.

7. The IoT network system according to claim 1, wherein if the node type of the idle node is defined as a leaf node type, the idle node joins the IoT network by using one of network nodes in the first tree structure or the second tree structure as the parent node.

8. The IoT network system according to claim 1, wherein the idle node sends a connection request to one of the network nodes in the first tree structure, a connection response is returned after the network node performs authentication according to the connection request, and the idle node joins the IoT network by using the network node as the parent node according to the connection response.

9. The IoT network system according to claim 1, wherein when the communication signal quality of the wireless access point is not greater than the preset value, and no network node meeting a networking condition is found through searching as the parent node, the idle node reduces the preset value to a weak preset value, and when the communication signal quality of the wireless access point is greater than the weak preset value, the idle node is communicatively connected to the wireless access point to form the root node of the second tree structure to join the IoT network.

10. The IoT network system according to claim 9, wherein the networking condition comprises the following: the searched network node has a data transfer capability, a number of child nodes of the searched network node does not reach a child node number upper limit, and a number of hops between the searched network node and the wireless access point does not reach a tier upper limit.

11. A networking method of an Internet of Things (IoT) network, wherein the IoT network comprises a plurality of network nodes and an idle node, the network nodes being communicatively connected to a wireless access point through a tree topology to form a first tree structure, and the networking method of the IoT network comprises:
   obtaining network configuration data and entering a networking stage after passing an authentication in a network configuration stage;
   determining whether the idle node has been defined with a node type according to the network configuration data in the networking stage;
   if the node type of the idle node is not defined, detecting communication signal quality of the wireless access point through the idle node;
   when the communication signal quality of the wireless access point is greater than a preset value, communicatively connecting the idle node to the wireless access point to form a node in a second tree structure; and
   when the communication signal quality of the wireless access point is not greater than the preset value, joining, by the idle node, the IoT network by using one of the network nodes in the first tree structure as a parent network.

12. The networking method of an IoT network system according to claim 11, wherein the step of joining, by the idle node, the IoT network by using one of the network nodes in the first tree structure as a parent network comprises: obtaining at least one adjacent candidate node through scanning from the network nodes; and selecting, as the parent node of the idle node, a candidate node with fewest hops according to a number of hops between the at least one candidate node and the wireless access point.

13. The networking method of an IoT network system according to claim 12, wherein the step of joining, by the idle node, the IoT network by using one of the network nodes in the first tree structure as a parent network further comprises: if there are a plurality of candidate nodes with the fewest hops, selecting, as the parent node of the idle node, a candidate node with fewest child nodes from the candidate nodes with the fewest hops.

14. The networking method of an IoT network system according to claim 11, wherein the parent node meets a networking condition, the networking condition comprising the following: the parent node has a data transfer capability, a number of child nodes of the parent node does not reach a child node number upper limit, and a number of hops between the parent node and the wireless access point does not reach a tier upper limit.

15. The networking method of an IoT network system according to claim 11, further comprising: if the node type of the idle node is defined as a root node type, communicatively connecting the idle node to the wireless access point to form the root node of the second tree structure to join the IoT network.

16. The networking method of an IoT network system according to claim 11, further comprising: if the node type of the idle node is defined as a leaf node type, joining, by the idle node, the IoT network by using one of network nodes in the first tree structure or the second tree structure as the parent node.

17. The networking method of an IoT network system according to claim 11, wherein the step of joining, by the idle node, the IoT network by using one of the network nodes in the first tree structure as a parent network comprises:

sending, by the idle node, a connection request to one of the network nodes in the first tree structure;

returning a connection response after the network node performs authentication according to the connection request; and joining, by the idle node, the IoT network by using the network node as the parent node according to the connection response.

18. The networking method of an IoT network system according to claim 11, further comprising:

when the communication signal quality of the wireless access point is not greater than the preset value, and no network node meeting a networking condition is found through searching as the parent node, reducing the preset value to a weak preset value; and when the communication signal quality of the wireless access point is greater than the weak preset value, communicatively connecting the idle node to the wireless access point to form the root node of the second tree structure to join the IoT network.

19. The networking method of an IoT network system according to claim 18, wherein the networking condition comprises the following: the searched network node has a data transfer capability, a number of child nodes of the searched network node does not reach a child node number upper limit, and a number of hops between the searched network node and the wireless access point does not reach a tier upper limit.

20. The networking method of an IoT network system according to claim 18, further comprising:

when the communication signal quality of the wireless access point is not greater than the weak preset value, suspending, by the idle node, networking; and when networking suspension duration reaches a timeout threshold, re-detecting the communication signal quality of the wireless access point through the idle node.

* * * * *